United States Patent
Higham

(10) Patent No.: US 7,694,288 B2
(45) Date of Patent: Apr. 6, 2010

(54) STATIC SINGLE ASSIGNMENT FORM PATTERN MATCHER

(75) Inventor: Andrew James Higham, Edinburgh (GB)

(73) Assignee: Analog Devices, Inc., Norwood, MA (US)

( * ) Notice: Subject to any disclaimer, the term of this patent is extended or adjusted under 35 U.S.C. 154(b) by 1167 days.

(21) Appl. No.: 11/256,817

(22) Filed: Oct. 24, 2005

(65) Prior Publication Data

US 2007/0094646 A1    Apr. 26, 2007

(51) Int. Cl.
*G06F 9/45* (2006.01)
(52) U.S. Cl. .................. 717/144; 717/136; 717/140
(58) Field of Classification Search .................. 717/146
See application file for complete search history.

(56) References Cited

U.S. PATENT DOCUMENTS 6,064,820 A * 5/2000 Subrahmanyam ........... 717/160
6,292,938 B1 * 9/2001 Sarkar et al. ................ 717/138

* cited by examiner

*Primary Examiner*—Wei Y Zhen
*Assistant Examiner*—Lanny Ung
(74) *Attorney, Agent, or Firm*—Goodwin Procter LLP

(57) ABSTRACT

The invention provides a method of processing a sequence of operands to produce compiled code for a target data processor, the method comprising the steps of: automatically analysing a source code to produce a fist representation of that code in single static assignment form; transforming the first representation into a second representation by unlooping Φ nodes within the single static assignment form so as to create code suitable for tree pattern matching to be performed thereon; performing tree pattern matching on the second representation of the code; and re-looping the Φ nodes.

11 Claims, 14 Drawing Sheets

Tree pattern for r0 = [fp + offset (b)]

```
1.   imm: ADDR                            = 0    { $$ = $1 }
2.   imm: OFFSET                          = 0    { $$ = "offsetof($1)" }
3.   imm: INT                             = 0    { $$ = $1 }
4.   r: imm                               = 1    { $$ = reg(R); emit($$ = $1) }
5.   p: imm                               = 1    { $$ = reg(P); emit($$ = $1) }
6.   p: FRAME                             = 1    { $$ = reg(P); emit($$ = fp) }
7.   p: ADD(p, p)                         = 1    { $$ = reg(P); emit($$ = $1 + $2) }
8.   r: ADD(r, r)                         = 1    { $$ = reg(R); emit($$ = $1 + $2) }
9.   r: ADD(r, imm)                       = 1    { $$ = reg(R); emit($$ = $1 + $2) }
10.  r: LOAD(p)                           = 1    { $$ = reg(R); emit($$ = [$1]) }
11.  r: LOAD(ADD(FRAME, imm))             = 1    { $$ = reg(R); emit($$ = [fp + $1]) }
12.  p: LOAD(p)                           = 2    { $$ = reg(P); emit($$ = [$1]) }
13.  p: LOAD(ADD(FRAME, imm))             = 2    { $$ = reg(P); emit($$ = [fp + $1]) }
14.  instr: STORE(p, r)                   = 1    { emit([$1] = $2) }
15.  instr: STORE(ADD(FRAME, imm), r)     = 1    { emit([fp + $1] = $2) }
16.  instr: STORE(p, p)                   = 1    { emit([$1] = $2) }
17.  instr: STORE(ADD(FRAME, imm), p)     = 1    { emit([fp + $1] = $2) }
18.  r: p                                 = 1    { $$ = reg(R); emit($$ = $1) }
19.  p: r                                 = 2    { $$ = reg(P); emit($$ = $1) }
20.  instr: r                             = 0
21.  instr: p                             = 0

Start nonterminal is instr
```

Fig. 3

```
1.  imm: ADDR                            = 0   { $$ = $1 }
2.  imm: OFFSET                          = 0   { $$ = "offsetof($1)" }
3.  imm: INT                             = 0   { $$ = $1 }
4.  r: imm                               = 1   { $$ = reg(R); emit($$ = $1) }
5.  p: imm                               = 1   { $$ = reg(P); emit($$ = $1) }
6.  p: FRAME                             = 1   { $$ = reg(P); emit($$ = fp) }
7.  p: ADD(p, p)                         = 1   { $$ = reg(P); emit($$ = $1 + $2) }
8.  r: ADD(r, r)                         = 1   { $$ = reg(R); emit($$ = $1 + $2) }
9.  r: ADD(r, imm)                       = 1   { $$ = reg(R); emit($$ = $1 + $2) }
10. r: LOAD(p)                           = 1   { $$ = reg(R); emit($$ = [$1]) }
11. r: LOAD(ADD(FRAME, imm))             = 1   { $$ = reg(R); emit($$ = [fp + $1]) }
12. p: LOAD(p)                           = 2   { $$ = reg(P); emit($$ = [$1]) }
13. p: LOAD(ADD(FRAME, imm))             = 2   { $$ = reg(P); emit($$ = [fp + $1]) }
14. instr: STORE(p, r)                   = 1   { emit([$1] = $2) }
15. instr: STORE(ADD(FRAME, imm), r)     = 1   { emit([fp + $1] = $2) }
16. instr: STORE(p, p)                   = 1   { emit([$1] = $2) }
17. instr: STORE(ADD(FRAME, imm), p)     = 1   { emit([fp + $1] = $2) }
18. instr: r                             = 1   { $$ = reg(R); emit($$ = $1) }
19. instr: p                             = 2   { $$ = reg(P); emit($$ = $1) }
20. instr: r                             = 0   
21. instr: p                             = 0   
22. r: Φ                                 = 0   { $$ = reg(R); } { generate_phi($$, $all) }
23. p: Φ                                 = 0   { $$ = reg(P); } { generate_phi($$, $all) }

Start nonterminal is instr
```

Fig. 11

STATIC SINGLE ASSIGNMENT FORM PATTERN MATCHER

FIELD OF THE INVENTION

The present invention relates to a method of examining instructions which have been written in a "high level" representation and which are to be executed by a programmable data processor, wherein the method selects machine specific instructions in order to achieve the goal of performing the high level instructions, and to a compiler performing the method.

BACKGROUND OF THE INVENTION

Programmers, whether writing for general purpose computers or specific data processors such as digital signal processors, DSP, choose to write in a high level programming language, such as C, because it is easily readable by a human and because the computer program may be automatically recompiled for different processors making it easier to reuse. These high level programs need to be translated into computer executable code. Typically this is done by a compiler in a multi phase process. In a first phase the high level language is processed to form a platform independent intermediate representation of the program. The platform independent representation might make explicit machine level constructs such as address calculation and the loading and storing values from memory, but the operations represented are generic and are available in the instruction set of all target processors. A second phase of processing takes these generic operations and converts them into platform specific machine instructions.

In practice all compilers can be divided into a part that is concerned with the source language often called the "front end" and a part that generates code and needs to know about the machine—the "back end" or "code generator". The two parts often communicate via a generic intermediate representation which is the representative form used herein. In many compilers the front-end runs for a period converting a piece of the high level program to intermediate representation then the back-end is called to generate machine instructions for that piece of the high level program, then the front-end runs again for the next piece of the high level program and so on.

An important part of the work performed in the code generator is "instruction selection" which chooses sequences of machine instructions to represent each generic operation in the intermediate representation. A simple approach is to replace each occurrence of a generic operation with a corresponding sequence of machine instructions in a one to one relationship. More sophisticated compilers seek to choose instructions according to the context of the generic operation within the intermediate representation depending on the operations surrounding or associated with that specific operation. Such a technique is implemented in compilers which perform "tree pattern matching". However, tree pattern matching has some limitations. More specifically it only works on tree like data structures and is limited to processing expressions in isolation. A closely related technique is directed acyclic graph, DAG, pattern matching. However, both of these techniques are limited to "straight line code" that is specifically they do not cope with code that contains loops.

The inability to handle loops is a significant drawback of tree pattern matching as the relationship of a generic operation to operations in previous and future iterations of the loop cannot influence the choice of machine instructions used to replace it. However it does not prevent the use of tree or DAG pattern matching to select instructions for the straight-line section of code within the loop.

Compilers have been the subject of much study since a poor compilation affects processor performance during task execution. Many techniques have been proposed to "optimise" compiler performance although in general such techniques result in executable code which is improved rather than optimised. Some of these require (or are much improved by) the transformation of the source code into a "single static assignment" form where every variable is only assigned once. Consider, for example, the code:

$Y=1$ $Y=4$ $X=Y$

We can easily see that the first assignment is redundant and that the value in the third line of code comes from the second line of code. A compiler would have to perform a definition analysis to determine this, and such an analysis would be computationally expensive.

If however the same code was transformed into a single static assignment form, then we would have:

$Y_1=1$ $Y_2=4$ $X_1=Y_2$

This representation of the source code makes it much easier to apply optimisation techniques such as sparse conditional constant propagation, global value numbering and dead code elimination.

SUMMARY OF THE INVENTION

According to a first aspect of the present invention there is provided a method of processing a sequence of operands to produce compiled code for a target data processor, the method comprising the steps of:
i. automatically analysing a source code to produce a first representation of that code in single static assignment form;
ii. transforming the first representation into a second representation by unlooping Φ nodes within the single static assignment form so as to create code suitable for tree pattern matching to be performed thereon;
iii. Performing tree pattern matching on the second representation of the code;
iv. Re-looping the Φ nodes;
v. performing a reduction phase of directed acyclic graph pattern matching; and
vi. performing a further traversal of the second representation, wherein the actions at the Φ nodes are split into a first part which computes the results of an action and which does not depend on the actions at an operand and a second part which is dependent on the operands and is called after the actions at the operand have been called.

It is thus possible to extend the optimisation techniques adapted for straight line code to loops.

BRIEF DESCRIPTION OF THE DRAWINGS

The present invention will further be described, by way of example, with reference to the accompany drawings, in which:

FIG. 3 is a "specification" for a target processor consisting of patterns that the processor can execute and the cost associated with the patterns;

FIG. 11 shows a specification for SSA pattern matching;

DESCRIPTION OF PREFERRED EMBODIMENTS OF THE INVENTION

Trees and Expressions

As discussed hereinbefore, many compilers have a front end that parses the high level source code and converts it to a machine independent intermediate expression. This invention is not directed to the front end of a compiler and, consequently, the operation of the front end need not be described here. We can assume that a process can be run to make the intermediate representation available to us.

Many intermediate representations are held in computer memory as linked data structures and can be represented as directed graphs. The Term "directed graph" is known to the person skilled in the art of writing compilers. A directed graph is a collection of nodes and edges. Edges connect nodes. Each edge has a direction. The node at the start of an edge is the predecessor of the node at the end of that edge, and the node at the end of the edge is the successor of the node at the start.

A directed graph that does not contain any cycles, i.e. paths from any node back to itself via any number of edges and other nodes, is known as a "directed acyclic graph" or DAG. A DAG in which no node has more than one immediate predecessor is known as a tree.

In a typical directed graph representation nodes correspond to operations and edges connect operations to their operands, indicating that the result of the operation at the successor node is used as an operand of the operation at the predecessor node.

With such a representation most expressions in a high level language can be represented by trees. For example suppose that a programmer writes a simple assignment expression in a high level language such as $a=b+2$.

Figure 1:
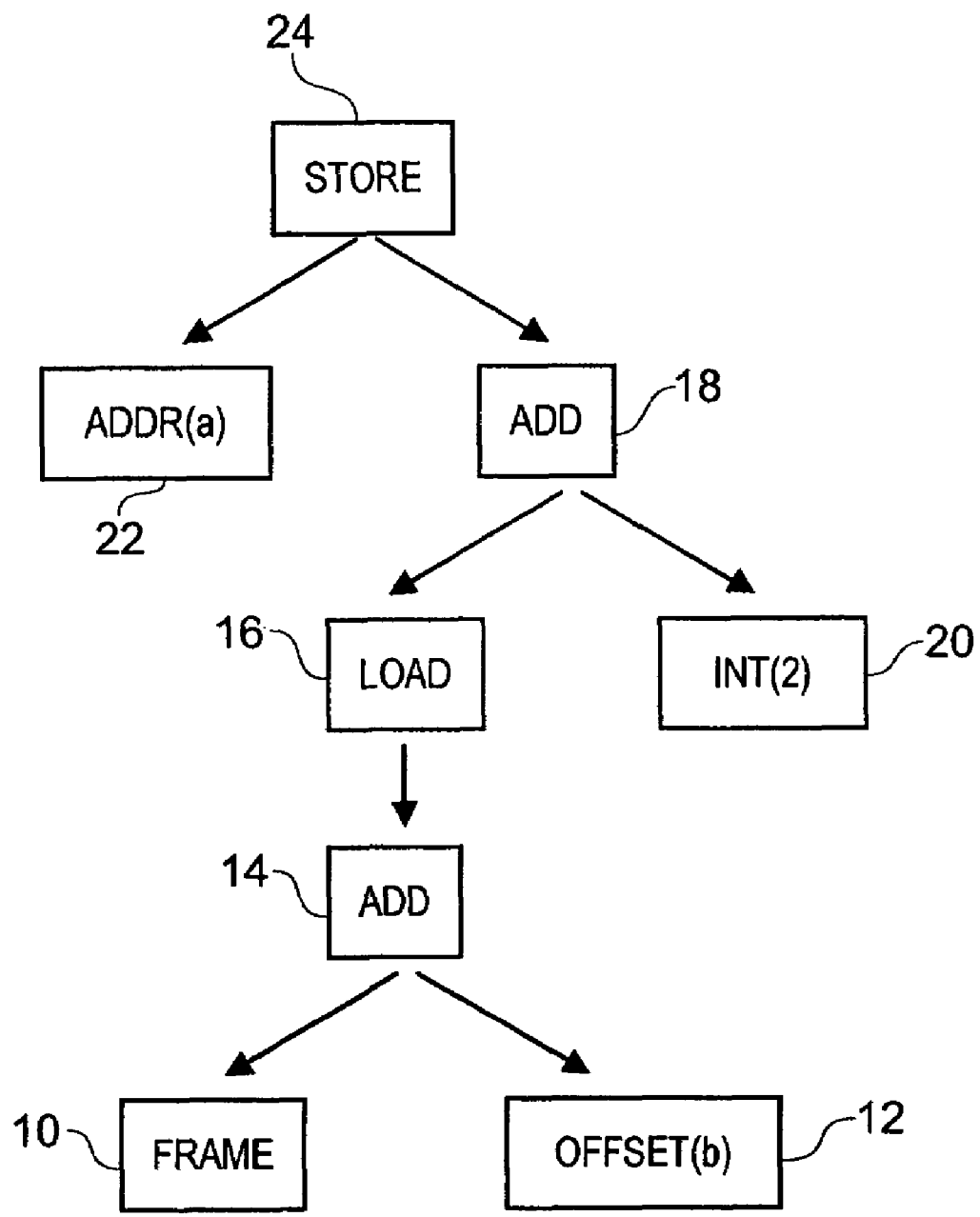
FIG. 1 is a first intermediate representation of machine executable instructions for performing the function a=b+2.

A tree representation of this expression is shown in FIG. 1. In this example the generic operations make explicit the calculation of addresses of memory locations and the loading and storing of values from and to these locations. As "b" appears on the right hand side of the "=" operator its use in the expression denotes the value of the variable "b" and the tree contains a LOAD operation at node 16 representing that value being read from a memory location. In this case the variable "b" is a local variable held on the "stack" of the data processor so its memory location is not known until the program executes. Consequently the address of the location must be calculated as part of the generated machine instructions. Therefore the internal representation also represents the address calculation. Node 14 adds the known offset of variable "b", represented by node 12, to the unknown base of the current local variables held on the stack represented by the FRAME operation at node 10. At node 18 the value loaded from "b" at node 16 is added to the integer "2" represented by node 20. The result of the addition then needs to be saved to the variable "a". In this case "a" is a global variable and its address will be known before the program executes and so is represented by the ADDR operator at node 22. Writing the value calculated at node 18 into the memory location for "a" is done by the STORE operation at node 24.

Patterns and Instructions

Once the intermediate representation shown in FIG. 1 has been determined, the objective of the compiler is then to convert that into machine specific instructions. An example sequence of instructions for an example processor for executing the expression a=b+2 as converted into a intermediate representation shown in FIG. 1 could be:

$r0=[fp+\text{offsetof}(b)]$ $r1=r0+2$ $p0=a$ $[p0]=r1$

Note that this example uses algebraic assembly syntax like the syntax used to program processors produced by Analog Devices, Inc. The identifiers r0, r1, p0 and fp name specific machine registers. The identifiers "a" and "offsetof(b)" stand for integers which will be made explicit in the executable code by the final phases of code generation—assembling and linking.

It is instructive to consider how such an instruction sequence may be generated by a compiler.

Comparing the above instruction sequence with FIG. 1 it can be seen that the instruction on the first line reads the frame value from the register fp and adds the integer "offsetof(b)" to obtain an address from which a value is loaded into register r0, thus it performs the operations at nodes 16, 14, 10 and 12. The second instruction corresponds to nodes 18 and 20 adding 2 to the value in register r0 leaving the result in r1. The third instruction implements node 22 where an address register p0 is loaded with the address at which the result of the sum is to be stored and finally the fourth instruction performs the operation at node 24 where the contents of register r1 are stored to the memory location (a) pointed to by register p0.

Comparing the instructions with the intermediate representation, it can also be seen that the machine instructions could themselves be described by trees with the same generic operators. For instance the first instruction which adds an integer to the register fp to compute an address from which a value is loaded could be represented by the tree shown in FIG. 2, which shows a tree starting with a node 16 with a LOAD operator with an edge to an ADD node 14 which has an edge to a FRAME node 10 and an edge to a sub-tree 25 that represents an integer. It can also be seen that a sequence of instructions that correctly calculates the expression represented by a tree must themselves be representable by trees which can be combined to construct the original tree. Finding instruction sequences with this property can solve part of the problem of instruction selection. The trees corresponding to instructions can be seen as patterns which must match groups of nodes in the intermediate representation tree.

The Specification of the Target Processor

Tree pattern matching is driven by a "specification" of the target processor consisting of patterns describing the instructions that the processor can execute. The table in FIG. 3 shows an example of such a specification. The numbered lines in FIG. 3 are rules. Apart from rules the specification specifies a "start nonterminal" used in the reduction phase described later. Reading from left to right each rule consists of a rule number, a nonterminal identifier followed by ":" a pattern and "=" followed by a cost. The final component of the rule is an action which appears in braces { } and is explained later.

Figure 2:
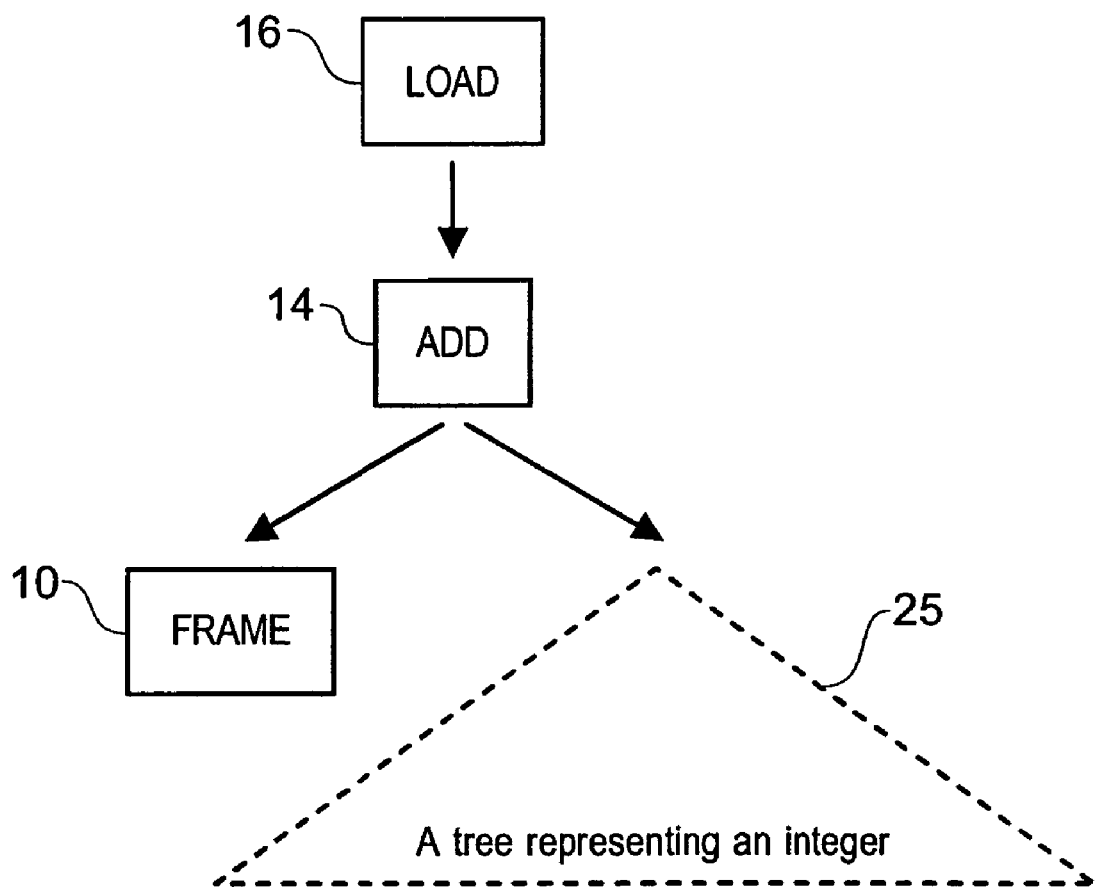
FIG. 2 shows a tree pattern for an instruction.

The rule describing the load instruction discussed above has rule number 11. The pattern shown in FIG. 2 is represented textually in this rule as "LOAD(ADD(FRAME, imm))". In this pattern LOAD, ADD, and FRAME identify the generic operator at a node and the successors of each nodes appear in parentheses after the operator. As a node with a FRAME operator can have no successors, it is not followed by parentheses. The operator "imm" is different. It is a nonterminal because it also appears on the left of a ":" in other rules in the specification. It acts as a placeholder for a further tree that may represent an integer. The concept of the further tree is shown as a triangle 25 in FIG. 2. Trees that "may represent an integer" are exactly those trees that can be matched by patterns in rules with "imm" as the nonterminal identifier on the left. Nonterminal identifiers can be used to represent any classification of trees convenient to the writer of the specification. Often, as in this case, they correspond to ways of holding values in the machine. Here "imm" corresponds to the immediate field of an instruction which can hold an integer value, "r" and "p" correspond to different classes of register and the rules with them on the left of the ":" describe instructions that leave their result in an r-register or a p-register respectively. The final non-terminal "instr" is used where no value is required but an instruction must be generated. The cost of executing a rule often corresponds directly to the number of clock cycles required to execute the particular instruction. Thus, the first three rules labelled imm:ADDR, imm:OFFSET and imm:INT respectively, relate to the time required to set up an address, an offset or an integer value respectively within an exemplary data processor core and each has an effective cost of zero as the value can be encoded directly in the immediate field of the instruction that requires it and no additional instructions need be generated to compute the value. This contrasts, for example, with rules 4, 5 and 6 which incur a cost of one and relate to the instruction to load an r register (a general purpose register) with a value, the instruction to load a p register (an address pointer) with a value and the instruction for loading a p register with a frame value respectively. It can be seen that rules 7, 8 and 9 relate to addition instructions and also cost 1 cost unit. The tenth rule which relates to loading a general purpose register with a value from a memory location addressed by a value p register also costs of 1, whereas loading a p register with the contents addressed another p register (rule 12) incurs a cost of 2 because this instruction takes longer.

The Labelling Pass in Tree Pattern Matchers

The first phase of tree pattern matching is called labelling. It works in a bottom-up manner processing every successor to a node before processing the node. At each node it tries to find rules with patterns that match the sub-tree rooted at the node currently under consideration. From these rules it chooses the rules with lowest cost, taking into account the cost of computing the operands that have different non-terminals on the left hand side (FIG. 3). This process can be thought of as filling in a table at the node which has entries for each nonterminal in the specification with each entry containing the lowest accumulated cost of the subtree matching that nonterminal and the rule number of the first rule required for the match. Some entries may be left blank because there are no rules that match the subtree rooted at the node and which have the appropriate nonterminal on the left hand side.

Figure 4:
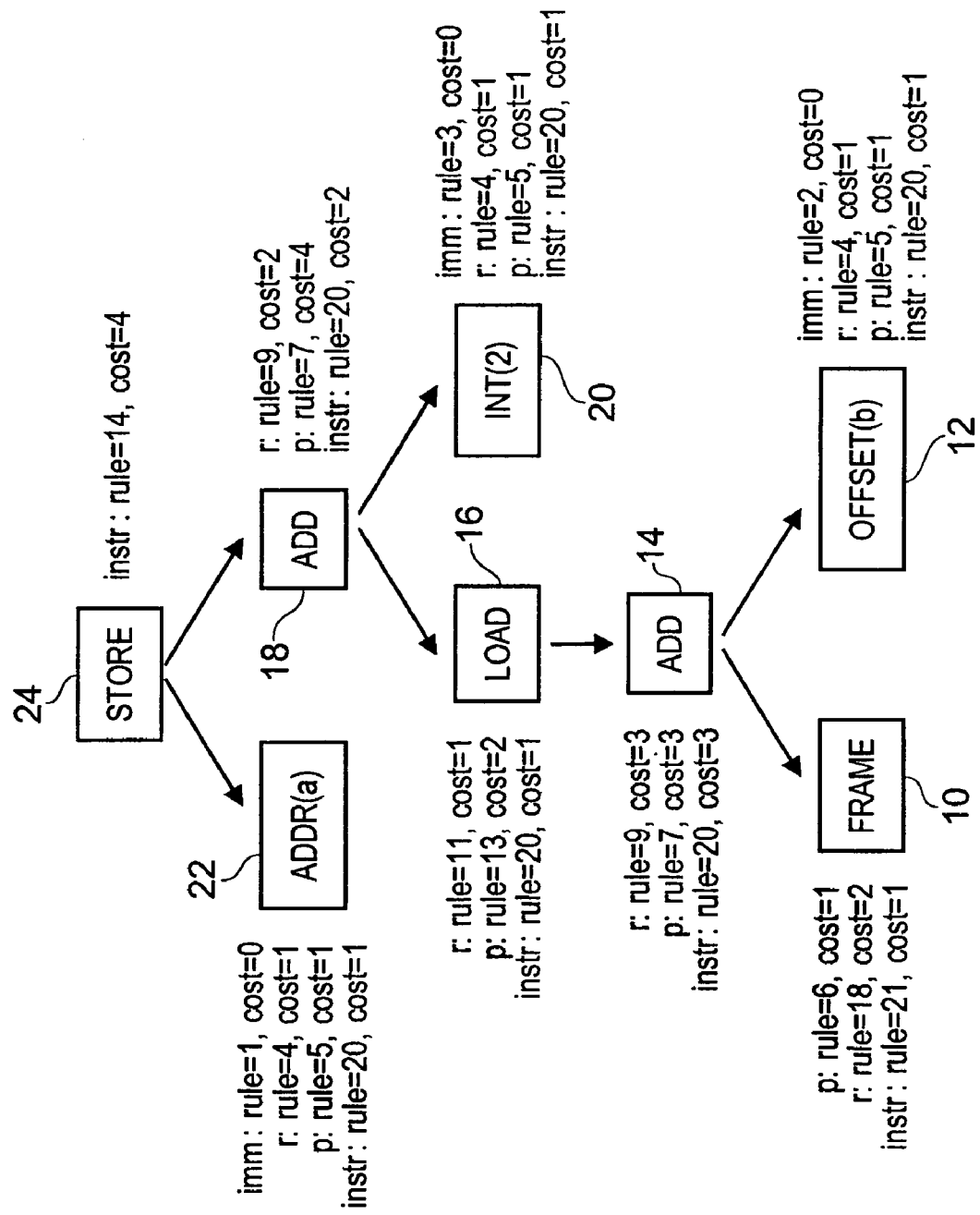
FIG. 4 schematically illustrates the tree of FIG. 1 after the labelling pass of tree pattern matching has identified the lowest accumulated cost for each sub tree matching every non terminal and the rules required for each match.

FIG. 4 shows the tree from FIG. 1 after the labelling phase of tree pattern matching using the specification in FIG. 3 has been completed. As nodes are processed in a bottom-up manner the labelling phase starts at the nodes with no successors. The first node processed is node 10 which has a FRAME operator. There is only one rule with the FRAME operator correctly positioned in the pattern, which is rule 6. The non-terminal on the left of this rule is "p" and the cost is 1, so it is recorded that the subtree rooted at this node could match "p" using rule 6 at a cost of 1. There are no other rules with a FRAME operator at the root but, having established that the subtree can match "p", rule 18 can be applied, because this rule has as its pattern the single nonterminal "p" meaning any subtree that can match "p" can also match the nonterminal on its left hand side, an "r", with the additional cost of 1. It can be seen in FIG. 4 that the labeller has recorded the subtree can match "r" using rule 18 with a cost of 2, that is one cost unit for choosing rule 18 and one more cost unit for choosing rule 6 which is needed to cause the subtree to match "p". Similarly rule 21 says any subtree that can match "p" can also match "instr" with no additional cost so the table of costs for node 10 also has an entry for "instr".

The compiler processes node 12 in a similar fashion. Rule 2 is the only rule that matches a node with the OFFSET operator, this rule says the subtree can match "imm" with a cost of 0. As the subtree can match "imm" rules 4 and 5 may then be used to allow the node to match "r" and "p" respectively. Finally as the node can match "r", rule 20 can be used to match "instr".

Node 14 may now be processed. Rules 7, 8, and 9 all have patterns beginning with an ADD operator and can match the subtree rooted at node 14. If rule 7 were chosen then both successors would have to match the "p" nonterminal. The pass has already recorded that the cost of the first successor, node 10, matching "p" is 1, and the cost of the second successor, node 12, matching "p" is also 1. These costs are added to the cost in the rule, giving 3 as the a combined cost for the entire subtree. The rule has "p" on the left hand side, so the labeller records that node 14 can match the non-terminal "p" using rule 7 with a cost of 3. Rule 8 has "r" on its left hand side and it also requires both successors to match "r". Node 10 can match "r" with a cost of 2 and node 12 with a cost of 1, combining these costs with the cost in the rule the labeller records that node 14 can match the nonterminal "r" with a cost of 4 using rule 8. Rule 9 also has "r" on the left but requires the successors to match "r" and "imm". Node 12 can match "imm" at a cost of 0 so the combined cost of using this rule for the subtree to match "r" is 3. This is less than the cost of the currently recorded rule so the compiler updates the table of costs to record that node 14 can match the nonterminal "r" with a cost of 3 using rule 9. As it is known that the node can match "p" the compiler tries rule 18, but finds it would cost more than the already recorded best rule for matching "r" and rejects it. Similarly it rejects rule 19. Finally it finds rule 20 and records that "instr" can be matched at a cost of 3, which is calculated by adding the zero cost in the rule to the previously calculated cost of matching "r" at the same node. Only the lowest cost rules for each non terminal are retained in the table, so only these rules are shown in FIG. 4.

Consequently the tree pattern matcher can now move on to process node 20 where an immediate value of 2 can be acquired at zero cost penalty but then needs to be placed into a p register or an r register in accordance with Rules 5 or 4 respectively at a cost of 1 cost unit. The pattern matcher then moves onto process the cost of node 18 where we see that the add instruction could be processed using Rules 7 or 9 at a cost of 1 unit but, for example, if processed using p registers would inherit a cost penalty of 1 unit from node 20 and a cost penalty of 2 units from node 16 bringing the cost penalty at node 18 to 4 units. However the pattern matcher would also note that the addition could be performed using Rule 9 where an r register could be added to an immediate value at a cost of 1 unit. This approach would inherent a cost of zero units from node 20 and a cost of 1 unit from node 16 (implemented using Rule 11) such that the total cost to node 18 could be as low as 2 cost units.

Moving to consider node 22 the cost of obtaining the immediate value of the address in accordance with Rule 1 is zero cost units but this then has to be stored in either a p register or an r register in accordance with Rules 5 or 4, respectively at a cost of 1 unit. Finally, moving up to consider the store operation at node 24 we see that the decision path at node 18 has resulted in the lowest cost solution involving an r register whereas node 22 can involve either an r or a p register and hence Rule 14 represents the lowest cost store rule. Thus the minimum cost to implement this series of operands has been determined by the tree pattern matching process, which is executed in software, to be 4 cost units.

Having successfully identified the minimum processing costs required to implement the process the compiler then makes a top down pass through the intermediate representation in order to determine the machine specific operands.

The Reduction Pass in Tree Pattern Matchers

The second phase of tree pattern matching is called reduction. It is top down, processing the predecessor of a node before processing the node itself. When a node is reached the nonterminal it has to match has already been identified. This nonterminal is looked up in the table generated during the labelling phase and the associated rule found. The phase then moves to the nodes that have to match nonterminals in the rule and continue the process at those nodes using the nonterminals from the rule. Reduction starts at the root of the tree, which is the node with no predecessors. This has to match the nonterminal identified as the "Start nonterminal" in the specification.

Figure 5:
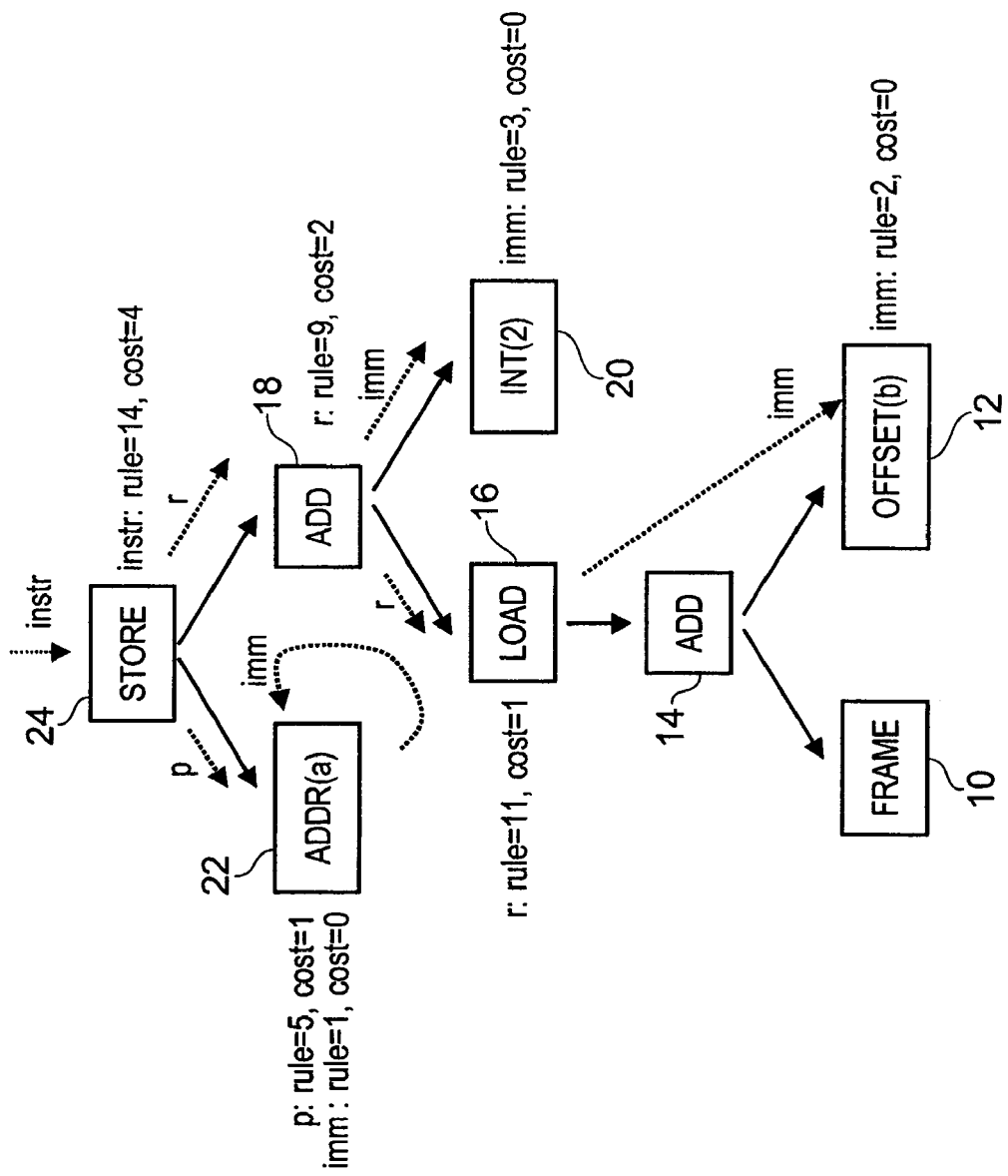
FIG. 5 shows the tree of FIG. 4 with the selected rules identified at each node.

FIG. 5 shows the example tree with the rules chosen during the reduction phase. The dotted lines show where the reducer moved to a new node and the nonterminal that it needed to match at that point.

The reduction process started at the root node, node 24, attempting to match the start non-terminal "instr". Looking up "instr" in the table produced by the labeller gave rule 14, which has the pattern STORE(p,r). To match this pattern the first subtree must match "p" and the second "r" so the reducer then moved to the first successor, which is node 22, attempting to match "p". At this node it found the rule to mach "p" is rule 5, which requires the same node to match "imm" so the reducer stayed at node 22 but now attempted to match "imm". The rule for "imm" is rule 1 with pattern ADDR. As this pattern contains no nonterminals this branch of the tree had been fully matched and the reducer moved to the second successor of node 24 and attempted to match "r" at node 18. Finding rule 9, with pattern ADD(r, imm), it moved on to try to match "r" at node 16, The rule for "r" at this node, rule 11, has the pattern LOAD(ADD(FRAME, imm)). The only nonterminal in the pattern, "imm", must be matched by the second successor of the successor of the root of the subtree so the reducer moved straight to node 12 and matching "imm" at this node caused it to choose rule 2. Finally the reducer moved to node 20 where, matching "imm", it chose rule 3.

Actions

In order to use tree pattern matching to actually do instruction selection the compiler must use the chosen rules to generate some representation of the instructions they correspond to. For example it could write text to a file for input to an assembler, but it could equally well generate a machine oriented internal representation for further processing within the compiler. The generation is done by actions associated with each rule. The specification in FIG. 3 includes actions that generate text, which appear to the right of their rules in braces { }, are written in pseudo-C. Within an action $$ stands for a variable associated with this nonterminal matched at this node and $1 and $2 stand for the variable associated with the first or second nonterminal in the rule's pattern at the node that matches it. In rules with no nonterminal in the pattern $1 stands for a value stored in the intermediate representation. Actions are called from bottom up and are typically embedded in the recursive code that performs the reduction.

Returning to our example, starting at node 12, the action for rule 2 is {$$="offsetof($1)"} the value at this node is "b" so the string "offsetof(b)" is assigned to the variable for "imm" at node 12. Moving up the tree to node 16 the action for rule 11 is {$$=reg(R); emit($$=[fp+$1])}. The first part of this action calls reg(R), which we must assume allocates an r-register and returns its name as a string. The result, in this case let it be "r1", is assigned to the $$ variable. The second part of the action calls emit, which could write its operand, a sting, to the assembly file. Replacing the $$ and $1 the string passed to emit is "r0=[fp+offsetof(b)]". Now the action for rule 3 is invoked at node 20 and the value from the node, "2", is assigned to $$. Moving to node 18 the action for rule 9, {$$=reg(R); emit("$$=$1+$2")}, is performed. Calling reg (R) allocates a new r-register, say "r1", which is assigned to $$, the variable for "r" at this node. Replacing $$ with "r1" from this node, $1 with the value of the variable for "r" at node 16 which was "r0" and $1 with the value of the variable for "imm" at node 20 which was "2", the string passed to emit is "r1=r0+2". Two rules were chosen at node 22, the first action invoked is the action for the last rule chosen, in this case rule 1, {$$=$1}, which assigns the value from the node, "a", to the variable associated with "imm". Next the action for rule 5, {$$=reg(P); emit($$=$1)}, is called and this allocates a p-register and assigns it to the variable associated with "p" and then calls emit with a string in which $$ takes its value from the variable for "p" and $1 the from the variable for "imm" both at node 22. So the string that is passed to emit is "p0=a". Finally the action for rule 14 is invoked at node 24. This contains a single call to emit. In this action $1 takes its value from "p" at node 22 and $2 from "r" at node 18, so the string passed to emit is "[p0]=r1". In the course of performing all these actions emit has been called four times generating the following code:

r0=[ffp+offsetof(b)]

r1=r0+2 p0=a

[p0]=r1

This is exactly the sequence discussed above.

From this description it can be seen that these actions consist of a part that assigns a register name or a literal value to $$, or the result of the action, and a part which calls emit to generate an instruction. This is a common characteristic of actions in instruction selectors because the values of sub-expressions have to be held somewhere between the instruction that calculates them and the instruction that uses them in the generated instruction sequence. These two parts are referred to later as the Result-computation and the Generation-part of the action.

Extending the Matcher

A feature of tree pattern matching is that any node may only have one predecessor node although it may have 0, 1 or more successor nodes.

The directed acyclic graph representations release the predecessor constraint imposed within a tree graph and consequently nodes may have more than one predecessor node. This enables sub-expressions within the code to be reused.

Tree pattern matching can be extended to DAGs almost without change. However whereas the algorithm described above is optimal for trees, always finding the cheapest match possible for the whole tree given the specification, it is not optimal for DAGs. Although not optimal DAG pattern matching can be useful and with careful crafting of specifications and use of appropriate heuristics can do a better job of instruction selection than alternative techniques.

DAG pattern matching uses the same specification so patterns continue to be trees even though they are now being used to match a DAG. The labelling pass is identical to the labelling pass of tree pattern matching. It is possible to process the nodes of a DAG in an order such that all successors have been processed before the node itself and so the costs at any particular node can still easily be calculated from the costs previously calculated at the successors.

The reduction pass is also similar to that of tree pattern matching. The major difference being that as nodes in a DAG may have more than one predecessor each a node might need to match different nonterminals due to rules at different predecessors which in turn could result in the successors needing to match different nonterminals. This is accommodated in a recursive reducer like that described above for tree pattern matching by adding a check to the reducer so that when it reaches a node with a new required nonterminal it checks to see if it has already been visited with that nonterminal, and only if it has not does it proceed to successor nodes to ensure they match the nonterminals from the rule. Another difference is that DAGs may have more than one node with no predecessors, which is simply handled by starting the reduction process with the start nonterminal at all such nodes.

Again the actions are similar to the actions in a tree pattern matcher. An action is only called once for each rule chosen at a node. If a node has two predecessors and the same required nonterminal is propagated from each then the action of the associated rule is only executed once, but its result is used in actions at both the predecessors. If a node has two predecessors and different required nonterminals are propagated then both associated actions will be executed possibly resulting in code to generate the same value being produced more than once. So for example if an ADD node had to match "p" for one predecessor and "r" for another the actions for the rule for "p" and the rule for "r" would both be called probably resulting in both an addition in the r-registers and in the p-registers being generated.

Figure 6:
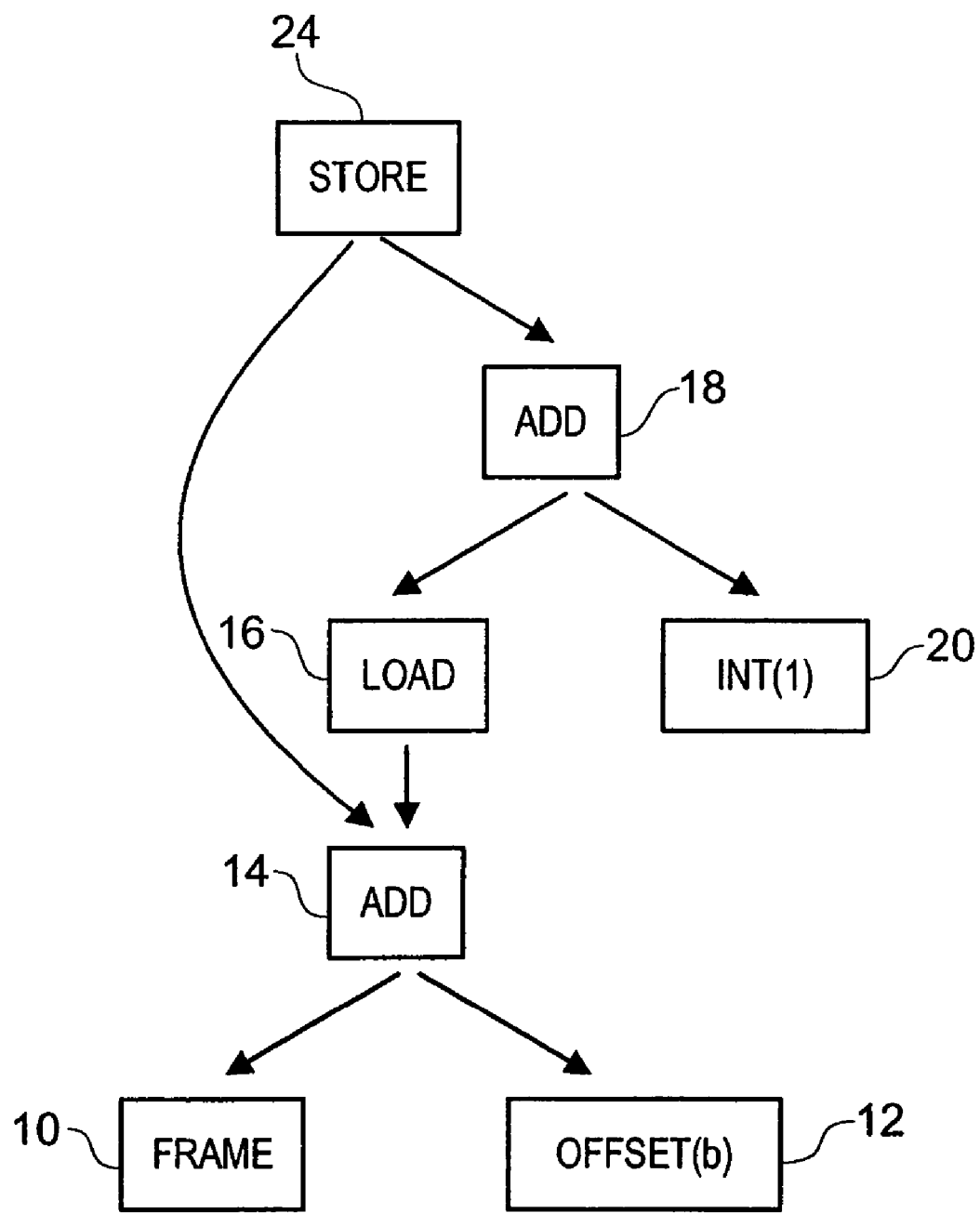
FIG. 6 schematically illustrates a second intermediate representation of the instructions b=b+1 in a form of a directed acyclic graph.

FIG. 6 schematically illustrates a directed acyclic graph which demonstrates an intermediate representation for evaluating the statement:

b=b+1

Figure 7:
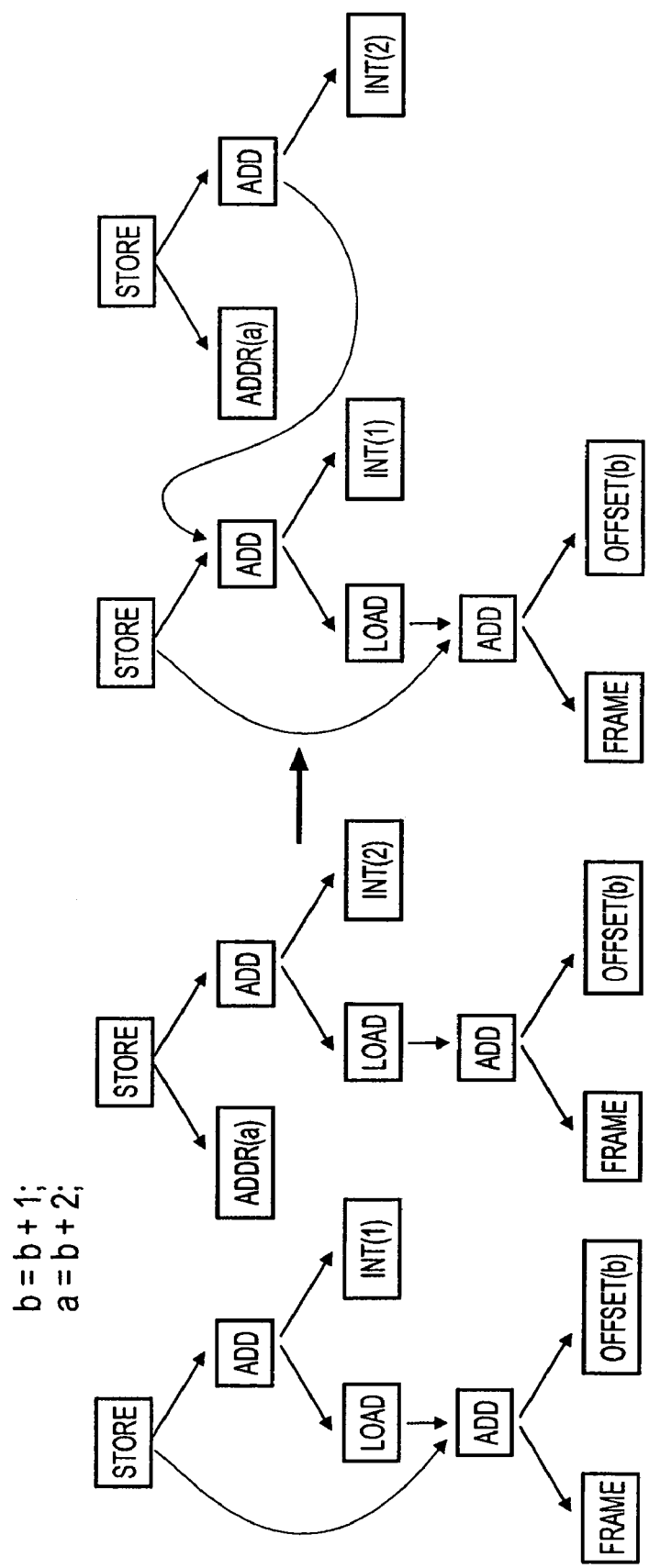
FIG. 7 schematically illustrates how intermediate expression in the form of directed acyclic graphs can be combined.

During the first execution of that statement the processor may have to process node 10 and 12 which correspond identically to nodes 10 and 12 described with respect to FIG. 1. Following on from there the processor will have to then process nodes 14, 16, 18 and 20 where once again these correspond identically to nodes 14, 16, 18 and 20 with respect to FIG. 1 except now that node 20 is adding a value of 1 rather than adding a value of 2. From node 18 control may then pass to node 24 where a store operation is performed. However on subsequent passes through this expression it is no longer necessary to calculate the memory address or stack position where b is stored because this calculation has already been done. Thus for subsequent passes nodes 10 and 12 may be dispensed with and execution can commence with the loading of the value into a register at node 16 based on the address computed at node 14. Another advantage of directed acyclic graphs is shown in FIG. 7 where interrelated expressions in straight line code can be interlinked. Thus on the left hand side of FIG. 7 two processing sequences are shown in order to calculate b=b+1 and a=b+2. The expression for a is dependent upon the expression for b having been evaluated and these separate expressions may be combined, as shown on the right hand side of FIG. 7. This may be advantageous as it may reduce the number of memory read and write operations and the combination of processing steps may enable more efficient operands to be used as demonstrated hereinbefore.

Although the directed acyclic graph represents an improvement over the tree graph neither of these representations cope with loops or equivalent repetitive or recursive functions.

Matching in Loops

The inability to handle loops is a significant drawback of tree and DAG pattern matching as the relationship of a generic operation to operations in previous and future iterations of the loop cannot influence the choice of machine instructions used to replace it. However it does not prevent the use of tree or DAG pattern matching to select instructions for the straight-line section of code within the loop.

Functions where looping occurs can be represented in the intermediate representation form as a single static assignment (SSA) form. A single static assignment form represents the data flow within a whole function but each variable is assigned only once. As used herein and with regard to this context the term "function" is synonymous with the terms procedure and routine (or sub-routine) and the choice of which term is favoured depends mainly upon which programming language a programmer is using. Thus the term "function" is frequently used by programmers programming "C"

whereas the same concept would be defined as a "procedure" by programmers using Pascal.

Suppose that we wish to represent the function:

```
int a[100], b;
void ex( ) {
    int i, s, *p;
    s = 0;
    p = &a;
    for (i = 0; i < 100; ++i) {
        s = s + *p;
        p = p + 1;
    }
    b = s
}
```

This function references global variables a and b. It also declares integer variables i, s and pointer variable p as local variables within the function. We can also see that s is initialised to zero, and p is initialised to the value "&a" (address a). Then the loop condition uses variable "i" as a loop counter and for i=0 to 100 forms s=s+p and p=p+1, and increments i on each loop. Finally, the value of the local variable p is transferred to the global variable b.

Consider the uses and definitions of "s" and "p". Because these variables are local to a function and frequently used the generated code will be more efficient if machine registers are used to store their values. If the compiler is choosing instructions for the machine described in the specification in FIG. 3, the most efficient choice would be to use a p-register for "p" and an r-register for "s", but that decision depends upon the costs of the operations performed on the variables so would best be done as part of instruction selection.

Figure 8:
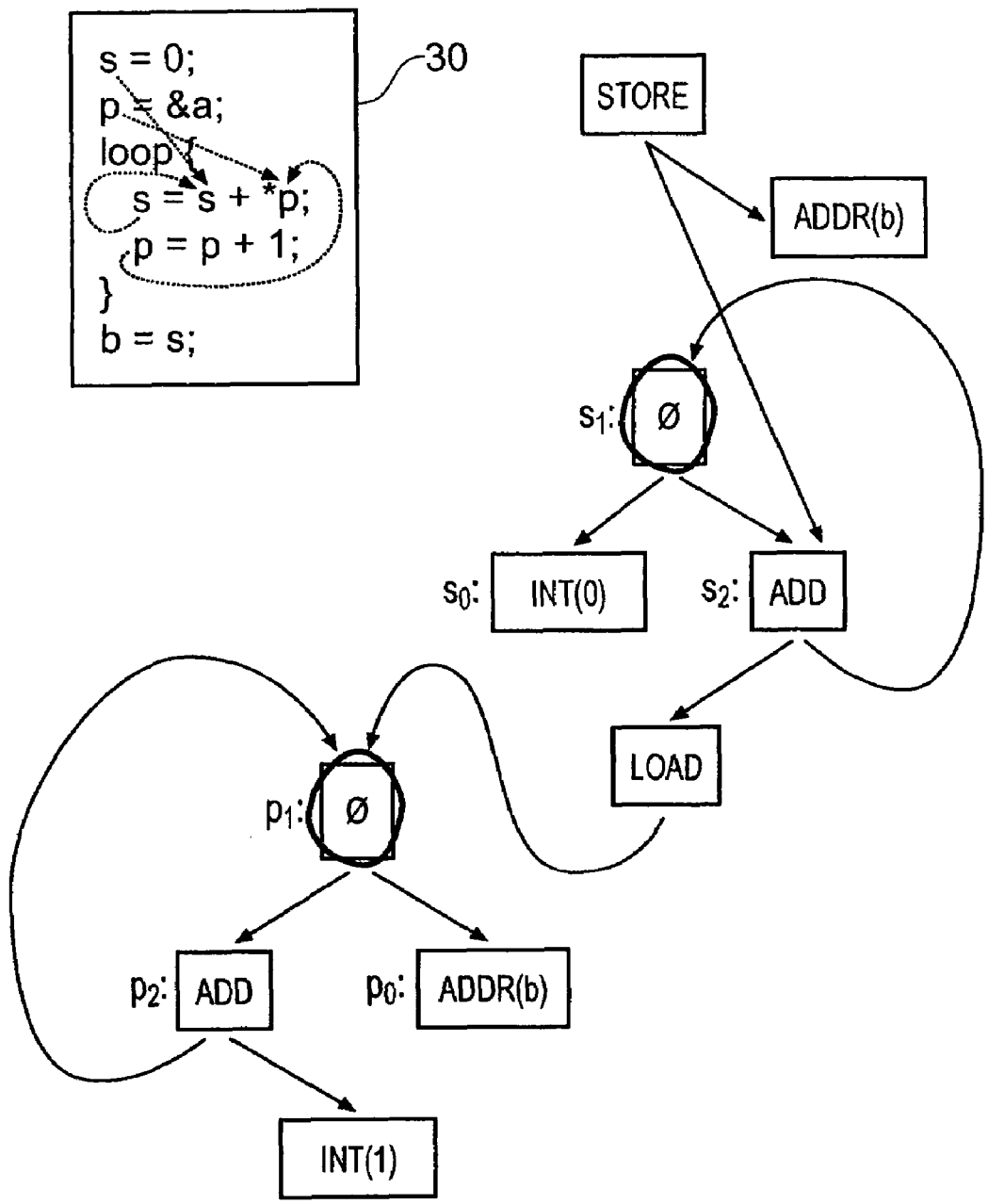
FIG. 8 schematically illustrates a representation of looping code function in a SSA form.

FIG. 8 schematically illustrates a simplified intermediate representation for the above code.

FIG. 8 more clearly demonstrates that for the first occurrence of p, it is loaded with a value at the address "a", where in subsequent uses p is incremented and refers back to a previous version of itself.

A feature of the single static assignment intermediate representation is that when the value of an operand may come from a succeeding operation (which need not be an immediately succeeding operation but may be several or indeed many operations down the intermediate representation) then this operand is replaced with a special node, known in the art as Phi functions, which are inserted in the single static assignment in order to allow for values to be merged.

The phi function effectively generates a new intermediate variable. Therefore if we look at FIG. 8 more closely we see that it is intended to represent

```
s = 0;
p = & a;
for ( ... ) {
    s = s + *p;
    p = p + 1;
}
b = s;
``` as set out in the box 30. As However, once converted to SSA form we have

```
s_0 = 0;
p_0 = &a;
for (...) {
    s_1 = Φ (s_0, s_2)
    p_1 = Φ (p_0, p_2)
    s_2 = s_1 + *p_1;
    p_2 = p_1 + 1;
}
b = s_2 ;
``` and the Φ (phi) functions return the value of one of their operands depending on which route was taken to reach the Φ function.

It is known that tree pattern matching cannot be performed directly on a single static assignment representation of the program because the cycles in the SSA form represent a problem. In particular, the labeller in the tree pattern matching process uses the costs calculated at successors of a node to calculate costs at the node. However, as some nodes may either directly or indirectly also be their own operands, and so their own successors, this raises the question of where to start the cost computation. Similarly, because actions for an operand must be executed before the action at a node utilising the results of those operands, the looping nature of the SSA form once again makes it difficult to decide where to start the invoking actions process.

Figure 9:
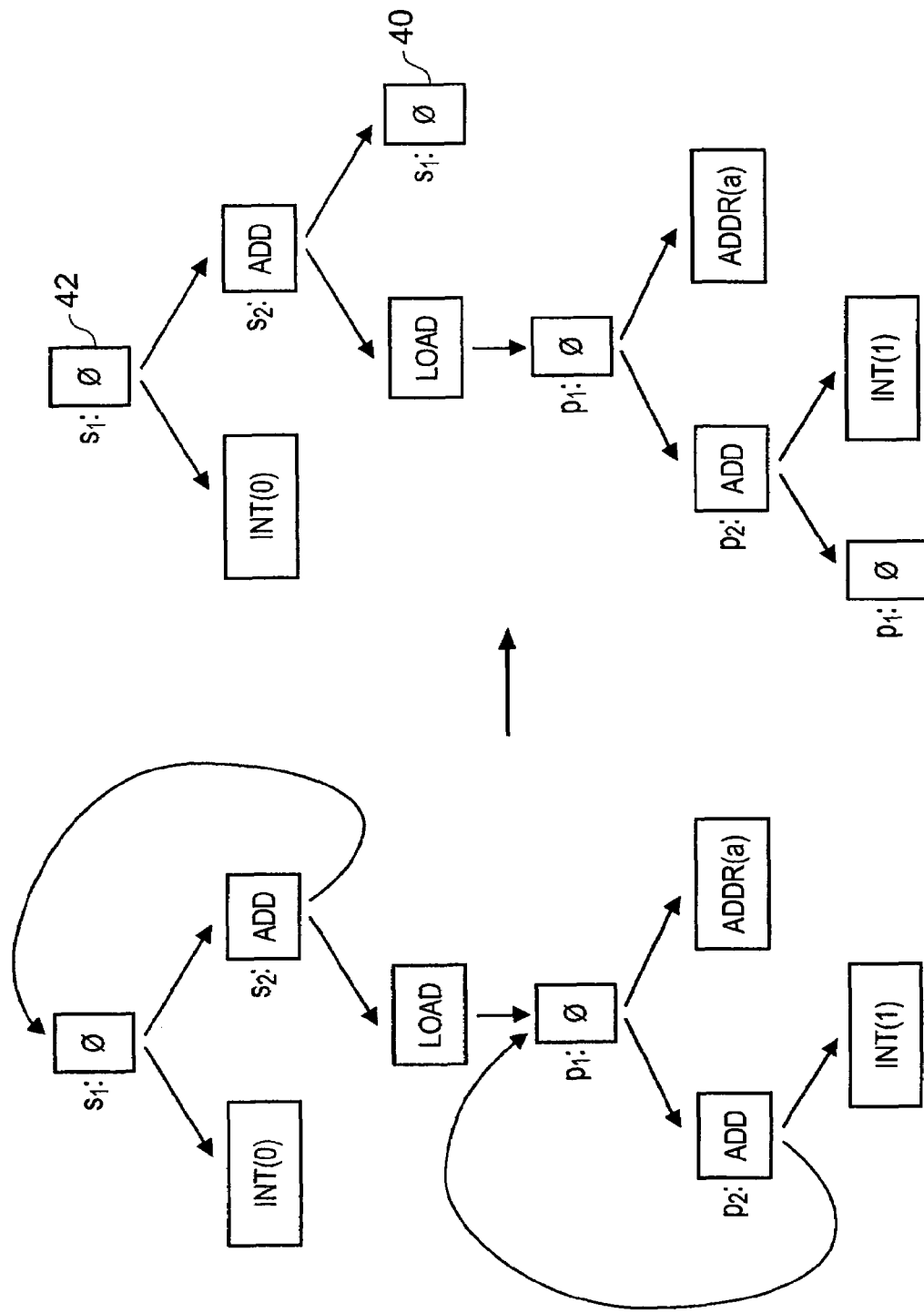
FIG. 9 schematically illustrates an intermediate conversion of an SSA representation (FIG. 9*a*) to a directed acyclic graph representation (FIG. 9*b*)

The inventor has realised that the single static assignment form can be converted into a format which is suitable for processing by converting the SSA graph into a directed acyclic graph thereby removing the cyclic nature from the graph. This transformation is schematically shown in FIG. 9. In essence, it could be seen that each cycle shown in FIG. 9a contains at least one Phi node. The Phi nodes have been labelled $s_i$ and $p_1$ for convenience. During the splitting process, each one of the Phi nodes is chosen and duplicated to produce a new "leaf" Phi node as well as one old "internal" Phi node. Thus, looking at the loop containing Phi nodes $s_1$, this is now split out (or un-looped) into a directed acyclic graph with the add operation which has been labelled $s_2$ now referencing a newly created leaf Phi node 40. This simple action makes the graph susceptible to processing by a labeller using the same processing that had been described hereinbefore with respect to FIG. 2. During this process the new leaf Phis, for example node 40 are attributed default costs indicating the restricted nonterminals that may be matched whereas the old internal Phis, for example node 42 have a cost attributed to them based upon their operands.

Figure 10:
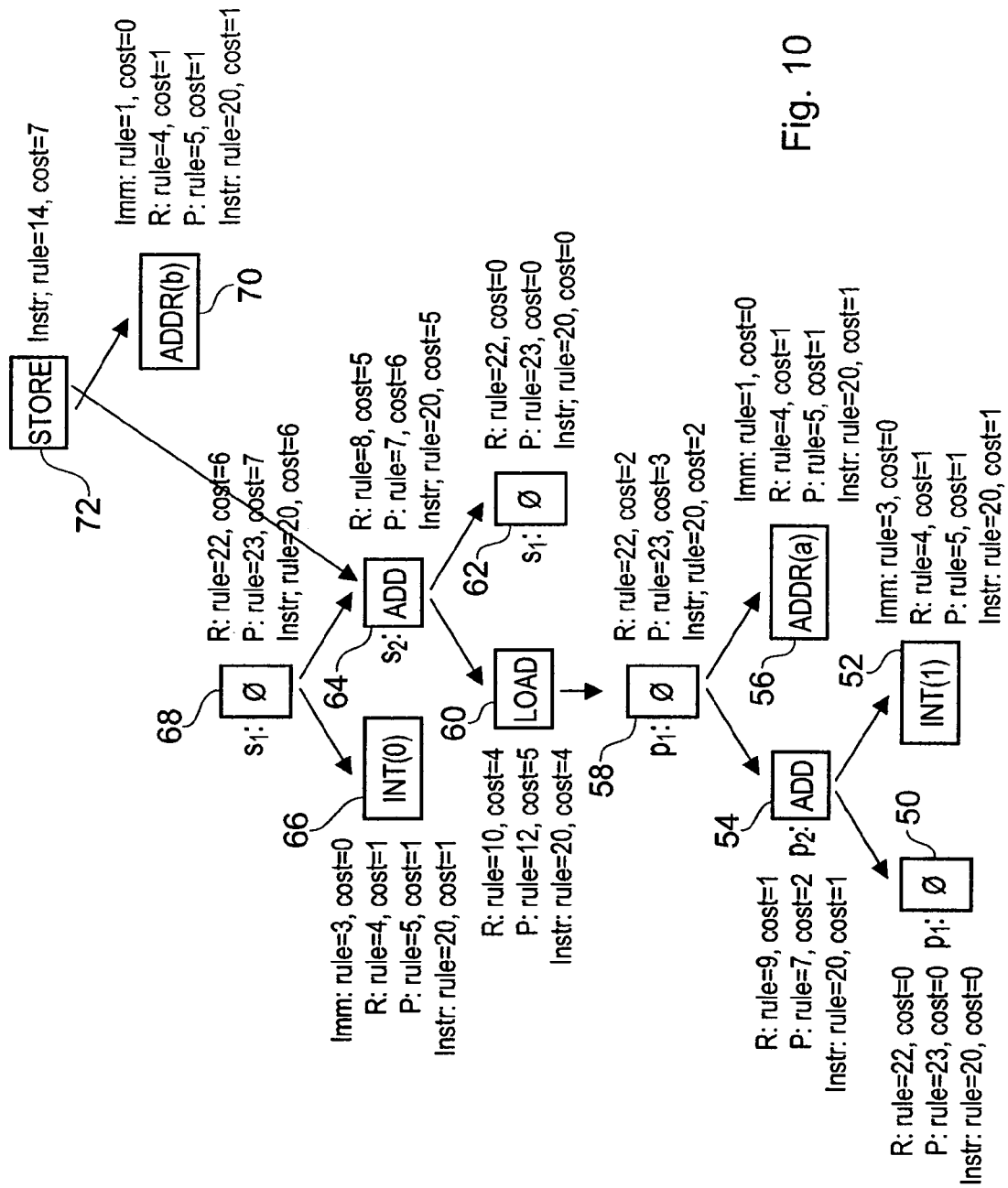
FIG. 10 schematically illustrates a SSA representation that has been processed to split the Φ nodes therein so as to form a directed acyclic graph representation of the function, and the costs and rules found by the labelling pass of SSA pattern matching.

FIG. 10 represents an example static single assignment internal representation that has been processed in order to split the cycles containing Phi nodes into a directed acyclic graph representation. FIG. 11 contains the specification described above extended with rules that match Phi nodes.

The labeller must work through the directed acyclic graph calculating the cost of matching the various nonterminals at each node. Therefore, node 50 which is a "leaf" node corresponding to internal node 58 and which was generated during unlooping or splitting process, is visited and rules 22 and 23 are found to match giving the cost of matching "r" and "p" as 0 respectively, as the node matches "r" it can also be found to match "instr" by using rule with a total cost of 0.

Similarly visiting node 52 which has the generic operator INT, rule 3 is found to match the node, giving a cost of 0 to match "imm". Now rules 4 and 5 can be used at an additional cost of one each to match "r" and "p" respectively and once "r" has been matched rule 20 provides a match for "instr".

Processing then moves to node 54 Rules 7, 8, and 9 which match subtrees starting with an ADD node are considered. Rule 7 requires both successors to match "p". Looking at the costs calculated at nodes 50 and 52 it can be seen that whereas node 50 can match "p" at a cost of zero, node 52 costs 1, adding these costs to the cost in rule 8 give a total cost of 2 for the subtree rooted at node 54 to match "p". Considering rule 8, which requires the successors of the ADD node to match "r", the costs for nodes 50 and 52 matching "r" are found to be 0 and 1 and so the total cost of using the rule to match "r" at node 54 is 2. Considering rule 9, which requires node 54 to match "imm" at a cost of 0 it is found that the total cost is only 1, cheaper than rule 8, so this is chosen a the best rule for node 54 to match "r". Finally rule 20 can be used to match "instr" at the same cost as matching "r". Processing then moves on to consider node 56 where an address is obtained and this can match "imm" using Rule 1 at a cost of zero units, it can then be found to match "r" and "p" using rules 4 and 5 respectively at an additional cost of 1 each. Processing can now move to node 58 which is an internal Phi node. At these nodes the Phi-rules 22 and 23 are interpreted as requiring all operands to match the nonterminal on the left. So considering rule 22 it is found that the cost of matching "r" is 2, and considering rule 23 it is found the cost of matching "p" is 3, finally as always rule 20 can be used after matching "r" to match "instr" with no additional cost. Similar considerations are then applied to nodes 60, 62, 64, 66 and 68 thereby allowing the cost of matching the internal Phi node $s_1$ at step 68 to be calculated. The costs associated with nodes 70 and 72 are also calculated enabling a final cost for execution of this portion of code to be obtained. Once the labelling has been completed, the Phi nodes are rejoined prior to performing the reducing step. At this stage, the cost of a leaf Phi node, for example Phi leaf node $p_1$, designated 50 or Phi leaf node $s_1$ designated 40 (62) are taken from the costs of the equivalent internal version of the Phi node.

Figure 12:
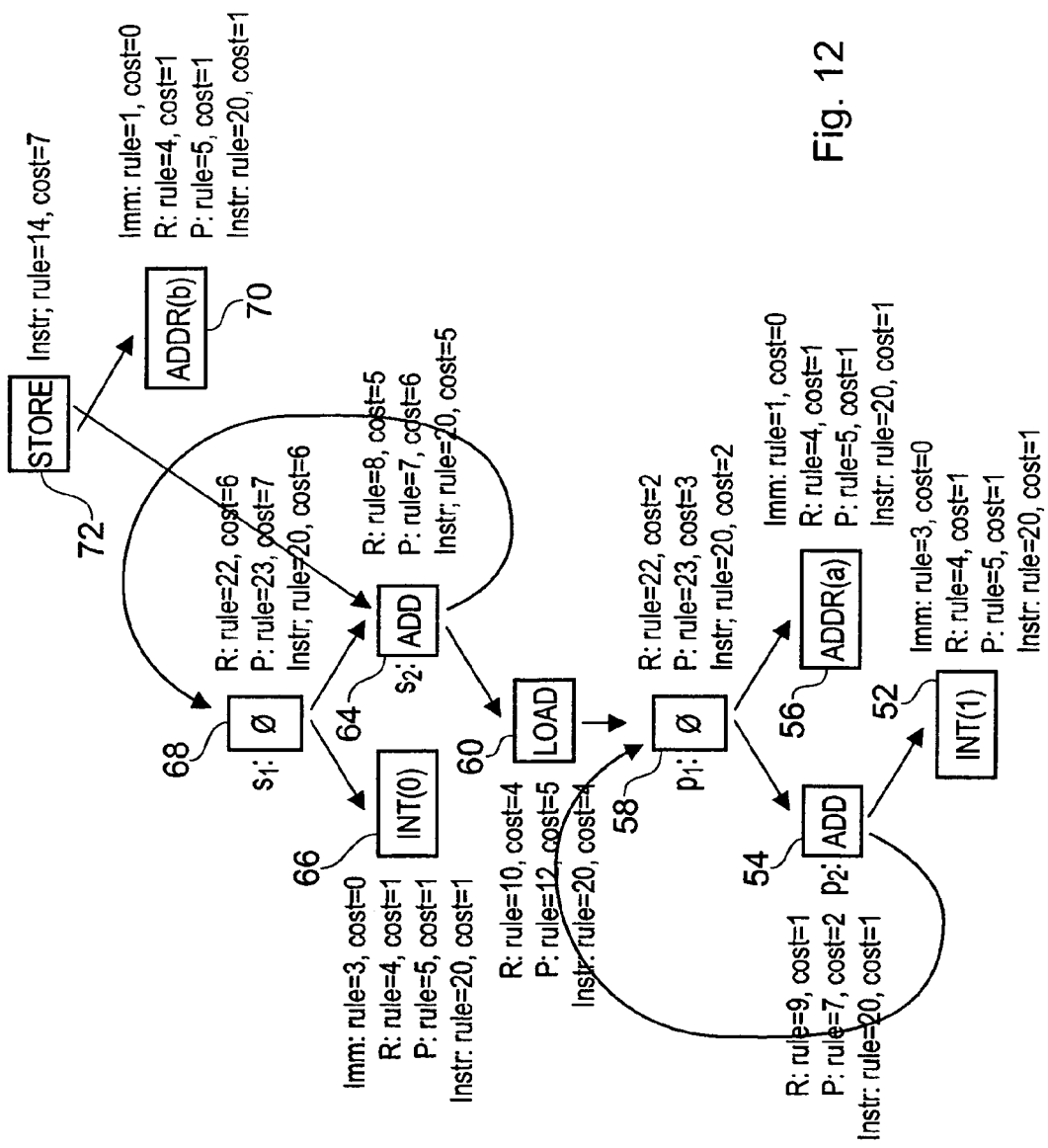
FIG. 12 shows the costs and rules associated with each node following rejoining of the loops around the Φ nodes.

FIG. 12 shows the effect of rejoining the nodes, and hence leaf node 50 is now removed and the left hand most exit of node 54 now points back into its parent or successor node 58. However the costs as determined during the labelling pass remain unaltered.

Control then passes to the reducing phase which repeats the process described hereinbefore with respect to FIGS. 4 and 5 extended as has been described for DAGS and hence performs a top down pass through the intermediate representation choosing rules to apply to the various nodes. The reducer described for DAG pattern matching can be run on SSA form even though it contains cycles so long as a rule is marked as chosen before processing continues at the successor nodes. The reducer may process a cycle in the SSA intermediate representation more than once, but in the worst case iteration must stop once the rules for all nonterminals have been chosen for all the nodes in the cycle. It is up to the writer of the specification to make sure this worst case does not happen in practice. It is worth considering an example reduction process in detail.

Referring to FIG. 12, the reduction process started at a root node, node 72, attempting to match the start non-terminal "instr". Looking up "instr" in the table produced by the labeller gave rule 14, which has the pattern "STORE(p, r)". To match this pattern a first sub tree must match "p" and a second sub tree "r" so the reducer then moved to the first successor, which is node 70, attempting to match "p". At this node it found the rule to match "p" is rule 5, which requires the same node to match "imm" so the reducer stayed at node 70 but now attempted to match "imm". The rule for "imm" is rule 1 with pattern "ADDR". As this pattern contained no non-terminals the branch of the tree had been fully matched and the reducer move to the second successor of node 72 and attempted to match "r" at node 64. Finding rule 8, with pattern "ADD(r, r)", it moved on to try to match "r" at node 60. The rule for "r" at this node, rule 10, has the pattern "LOAD(p)" so the reducer moved to node 58 attempting to match "p".

Node 58 is a $\Phi$ node, and the rule for "p" is rule 22, a $\Phi$ rule, which requires all its successors to match the same nonterminal as the $\Phi$ node—in this case "p". So the reducer moved to node 54 attempting to match "p" which cause it to select rule 7 with pattern "ADD(p, p)". The first successor of node 54 is node 58, so the reducer attempted to match "p" at 58 again, but finding that it had already matched "p" at this node it did not revisit node 58's successors. So the traversal of the cycle containing nodes 58 and 54 was complete and the reducer could move on to the second successor of node 54 attempting to match "p" at node 52, which caused rule 5 to be selected. This rule requires the same node to match "imm", so the reducer also selected rule 3, with pattern INT, at node 52 completing the matching of this branch.

The reducer then returned to the second operand of node 58 which is node 56. Attempting to match "p" at this node caused rule 5 to be selected and an attempt to match "imm" at the same node which resulted in rule 1 being selected too.

The reducer now returned to the unmatched second operand of node 64. Matching "r" at node 68 selected rule 22, causing "r" to be matched at node 66. Looking up "r" in the table at node 66 selected rule 4 which required "imm" to be matched also at node 66. This cause rule 3 to be selected at this node. Finally the reducer returned to the second operand of node 68 and attempted to match "r" at node 64. At this point it found that it had already matched "r" at this node, due to its use in the pattern "STORE(p, r)" at node 72, and so did not need to visit its successors again and the reduction process finished.

Figure 13:
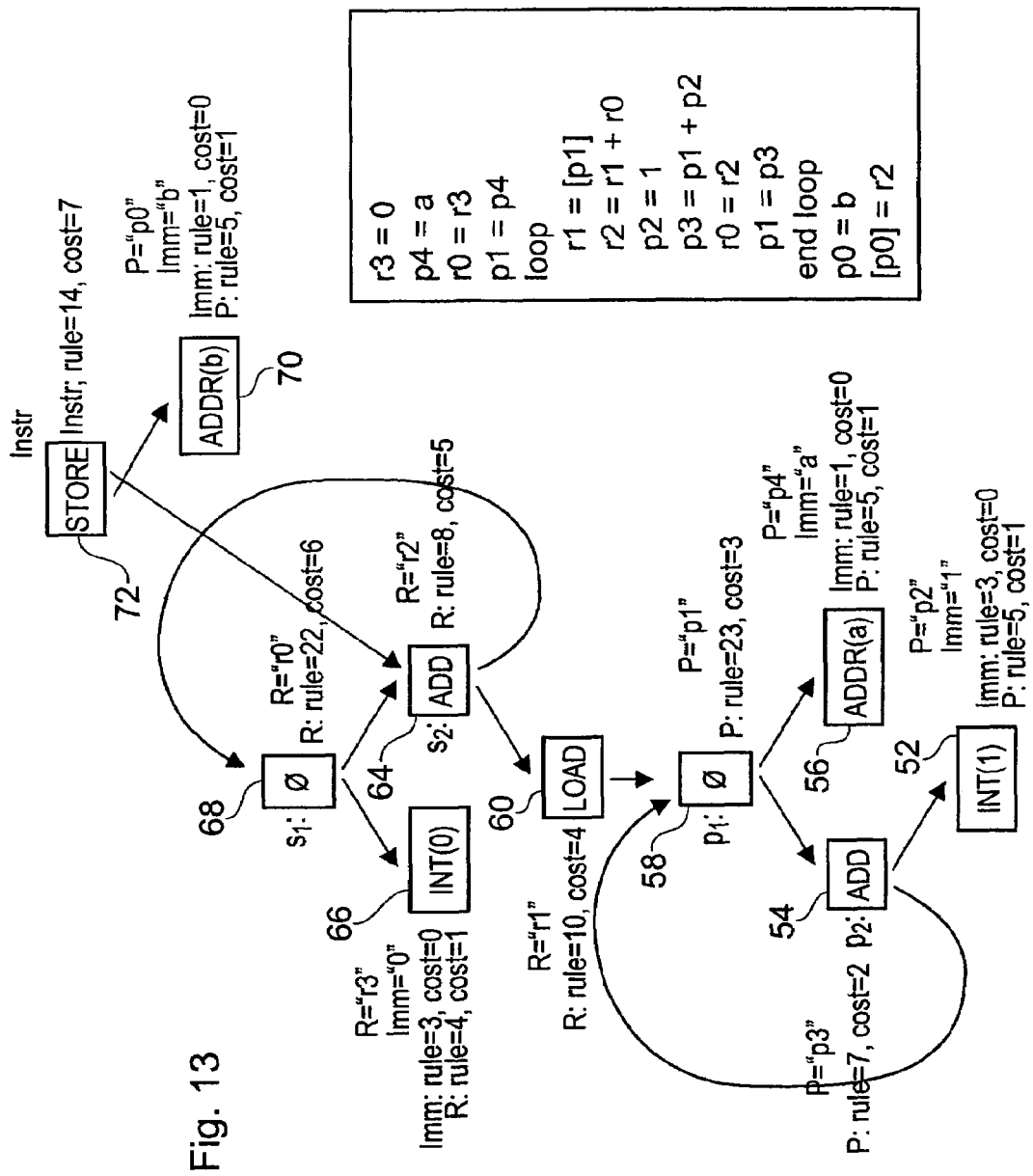
FIG. 13 shows the output of the reducing step, and shows the output of executing the actions associated with the selected rules.

Either during the reduction pass or afterwards, the actions associated with the chosen rules are called. In the example specification shown in FIG. 11 the actions allocate registers and generate assembly text. The result of this process is shown in FIG. 13 where the chosen instructions and register allocations are set out more clearly. Thus, at node 72 Rule 14 has been chosen and as a consequence node 70 must match "p" using rule 5, when the action for this rule was called the p register "p0" was allocated and returned as the result of the action so is shown in the figure associated with "p" at this node. Similarly node 64 uses rule 8 to match "r" and when the action was called it allocated an r register, "r2". Other register and rule allocations are set out in FIG. 13.

The pass that calls actions is primarily bottom-up. The problem of initiating the actions within cycles in the SSA graph is again handled by special processing of phi nodes. Looking at the specification in FIG. 11 it will be seen that the actions to the right of the phi rules, 22 and 23 are split into two parts. The first part generates the result of the action without referencing the results of the actions for rules chosen at successor nodes. This part of the action is called as soon as a value for the action at the phi node is required. The second part completes the phi action once the first part of the actions for the rules chosen at its successors have been chosen. Actions can be called in a bottom up manner embedded in a recursive traversal of the graph staring at nodes with no predecessors and at phi nodes. The pass in this manner through the graphical representation of FIG. 13 results in the instructions being produced out of sequence and a compiler must take account of this. Thus, starting at node 72 and visiting 70 the actions for rule 1 and rule 5 are called which results in the generation of the second final instruction p0=b. Moving from node 72 to 64 may then, for example, follow a path which goes from node 64 to the Phi node $s_1$ where the first part of the action is called and an r register r0 is allocated to that node. The recursion returns to node 64 and then progresses to node 60 and from there to node 58. At node 58 the first part of the action for rule 23 is called and a p register, "p1", is allocated. Returning to node 60 the action for rule 10 is called. This allocates "r1" and generates the instruction "r1=[p1]". Next the action for node 64 can be called which generates "r2=r1+r1" inside the loop and returning to node 72 the final instruction [p0]=r2 is produced and the traversal that started at this node is finished. The pass moves on the next phi node or node with no successors. In this case it restarts at $s_1$ at node 68, from here it visits node 66 and calls the actions for rules 3 and 4, generating "r3=0" which it places before the loop.

As the compiler has already called the action for rule 8 at node 64 and so has the results of actions at all successors of $s_1$ it can now perform the second part of the phi action at that node. In the example specification in FIG. 11 the second part of both phi actions call "generate_phi( )" which generates code to implement the phi by inserting move instructions in the control flow blocks that precede it. In this case as the register r0 was allocated by the first part of the phi action, and the phi $s_1$ is associated with the start of the loop, "r0=r3" is inserted before the loop and "r0=r2" before the end of the loop.

The compiler may then move on to $p_1$ at node 58 which has nodes 54 and 56 as successors. Moving to node $p_2$ (node 54) it finds it already has the result of $p_1$ and moves to node 52 where it generates the instruction "p2=1". It occurs three lines down in the list of commands below the "loop" instruction. The action for node 54 can then be evaluated and this allocates register p3, and is represented as "p3=p1+p2". Next the compiler moves on to evaluate node 56 and the next available p register is p4 and this is represented by the second term in the list of instructions, namely "p4=a".

Finally the second part of the action for $p_1$ can be called and, outside the loop this is generates "p1=p4" which occurs as the fourth instruction within the series of instructions whereas within the loop this is represented by the instruction "p1=p3". Thus the compiler has been enabled to utilise the techniques of pattern matching and reduction which hitherto have only operated on linear sections of code in order to cope with a single static assignment. Thus tree pattern matching may now be applied to a whole "function" (i.e. routine, procedure and the like).

The output of the compiler may then be saved to disk, written into memory such as EEPROM associated with the target device or, during development of the code, sent to an emulator or test rig to determine if the source code (and hence the compiled target coded derived from it) performs to the designers requirements.

Figure 14:
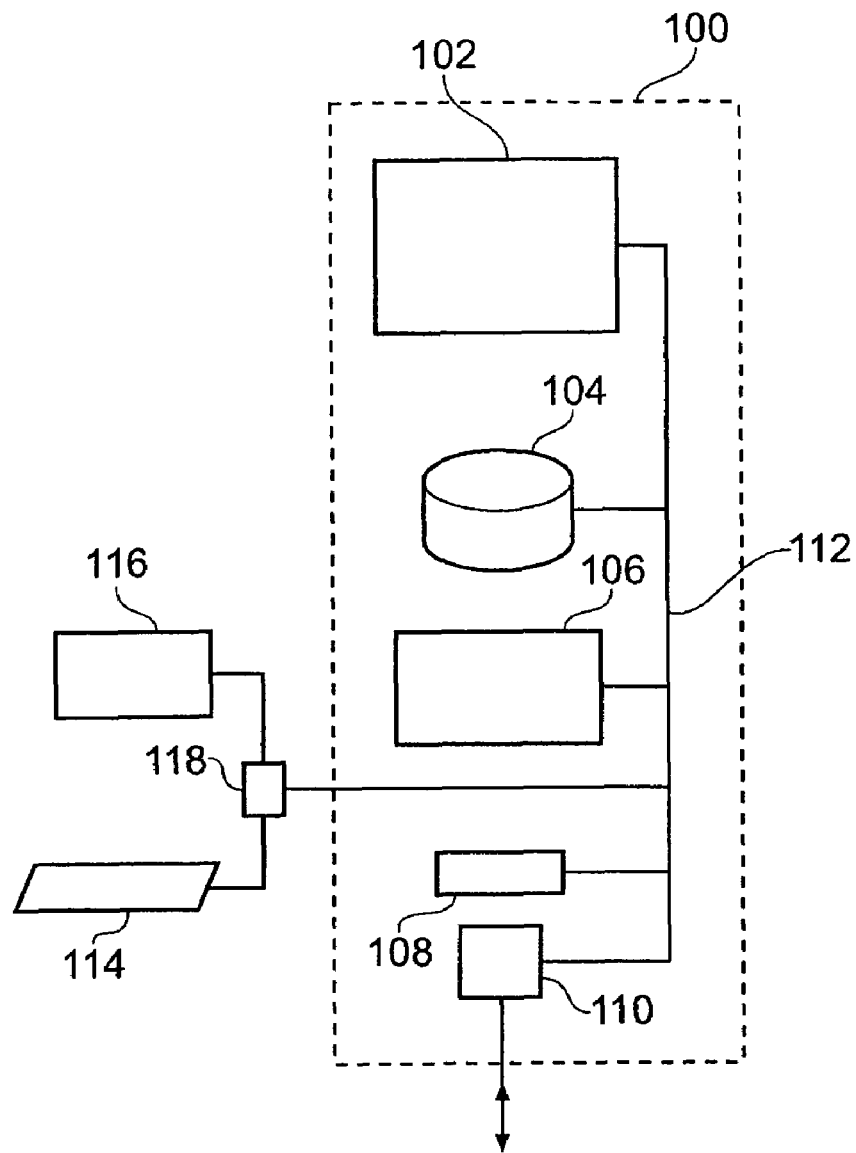
FIG. 14 shows a data processor for executing a compiler.
Figure 15:
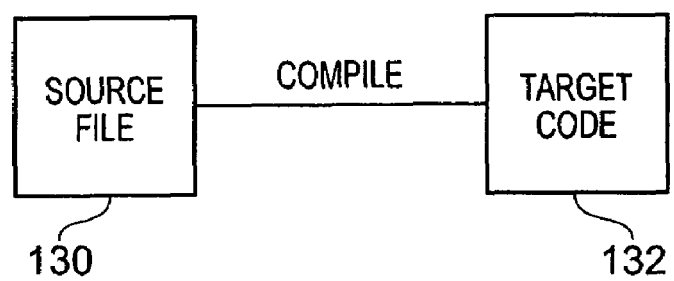
FIG. 15 shows the action performed by the compiler.

Typically the compiler runs on a general purpose data processor. An example of such a data processor is shown in FIG. 14. The data processor, generally designated 100, comprises a CPU 102 in communication with non volatile storage, for example a hard disc, semiconductor memory 106, a storage device interface 108 and a network card 110 via a bus 112. The CPU 102 can also connect to user interfaces, such as a keyboard 114 and a visual display unit 116 via a suitable controller 118. In use code written in a high level language is presented to the data processor 102 for compilation. The code can either be entered via the user interface 114 or can be read from the file stored in the hard disk 104, on removable memory storage devices presented to the input output interface 108 or received over the network connection 110. The data processor 102 executes the compiler program which had been stored on its hard drive 104 in order to read the high level language, for example from a source file 130 (FIG. 15) and converts the high level language into target code which may for example be written to a file 132. The target code could be passed to a device on the test rig or could be evaluated by an emulator, which may also run on the data processor 100.

The improved compiler constituting an embodiment of the present invention may itself be written onto removable storage or transferred to another data processor.

It is thus possible to provide an improved compiler.

The invention claimed is:

1. A computer-implemented method of processing a sequence of operands to produce compiled code for execution by a target data processor, the method comprising the execution by a processor of steps of:
    (i) automatically analyzing a source code to produce a first representation of that code in single static assignment form;
    (ii) transforming the first representation into a second representation by unlooping Phi nodes within the single static assignment form such that each Phi node is duplicated to produce a new leaf Phi node corresponding to an internal Phi node so as to create code suitable for tree pattern matching to be performed thereon;
    (iii) performing tree pattern matching on the second representation of the code;
    (iv) re-looping the Phi nodes;
    (v) performing a reduction phase of directed acyclic graph pattern matching; and
    (vi) performing a further traversal of the second representation, wherein actions at the Phi nodes are split into a first part which computes the results of an action and which does not depend on actions at an operand and a second part which is dependent on the operands and is called after the actions at the operand have been called.

2. A method as claimed in claim 1, in which leaf node Phi nodes are assigned a predetermined cost during the pattern matching step.

3. A method as claimed in claim 2, in which the predetermined cost assigned to a leaf Phi node is zero cost penalty units.

4. A method as claimed in claim 2, in which a cost assigned to an internal Phi node is the cost of executing operands in the second representation up to that internal Phi node.

5. A method as claimed in claim 4, where the cost of executing operands in the second representation is calculated using tree pattern matching.

6. A method as claimed in claim 5, in which during pattern matching a successor node which is an external Phi node or a leaf Phi node is assigned a default cost from a pattern matching specification.

7. A method as claimed in claim 1, in which during the step of re-looping the Phi nodes an execution cost associated with an internal Phi node remains unchanged.

8. A method as claimed in claim 1, in which during or following the step of re-looping the Phi nodes a cost associated with a predecessor node of a leaf node remain unchanged.

9. A method as claimed in claim 1, in which the further traversal is a recursive traversal.

10. A computer system comprising a tangible computer-readable medium adapted to execute instructions to perform the method claimed in claim 1.

11. A compiler program product comprising a tangible computer-readable medium having recorded thereon machine-readable code which when executed causes a programmable data processor to:

(i) automatically analyze a source code to produce a first representation of that code in single static assignment form;
(ii) transform the first representation into a second representation by unlooping Phi nodes within the single static assignment form such that each Phi node is duplicated to produce a new leaf node corresponding to an internal Phi node so as to create code suitable for tree pattern matching to be performed thereon;
(iii) perform tree pattern matching on the second representation of the code;
(iv) re-loop the Phi nodes;
(v) perform a reduction phase of directed acyclic graph pattern matching; and
(vi) perform a further traversal of the second representation, wherein the actions at the Phi nodes are split into a first part which computes the results of an action and which does not depend on actions at an operand and a second part which is dependent on the operands and is called after the actions at the operand have been called.

* * * * *